No. 801,860. PATENTED OCT. 17, 1905.
B. R. FALES & E. L. BARNES.
UNDERGROUND CONDUIT AND EXPANSION JOINT THEREFOR.
APPLICATION FILED JULY 11, 1904.
·FIG·1·
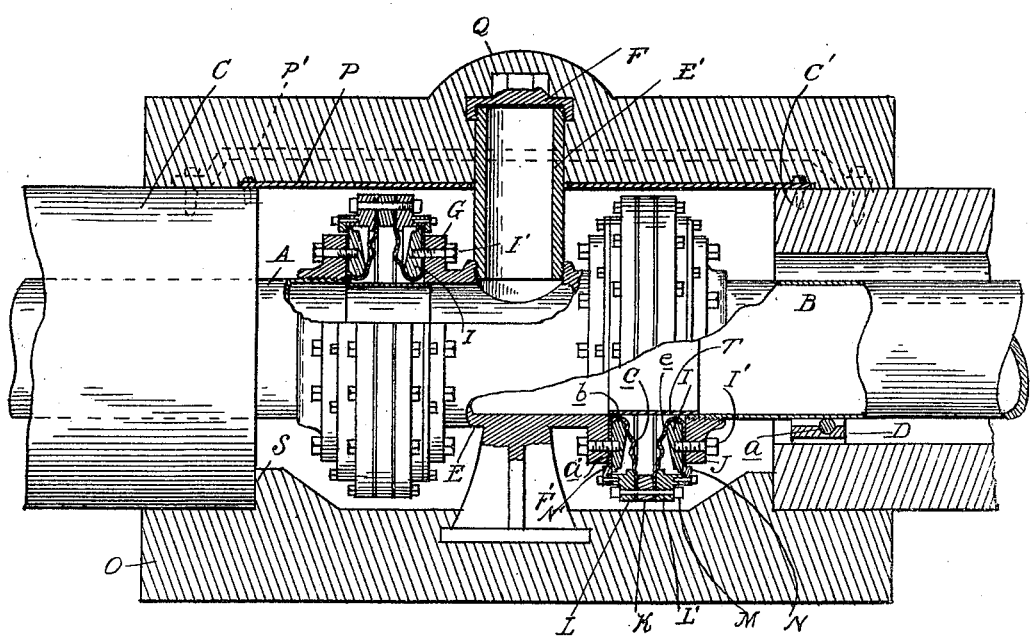
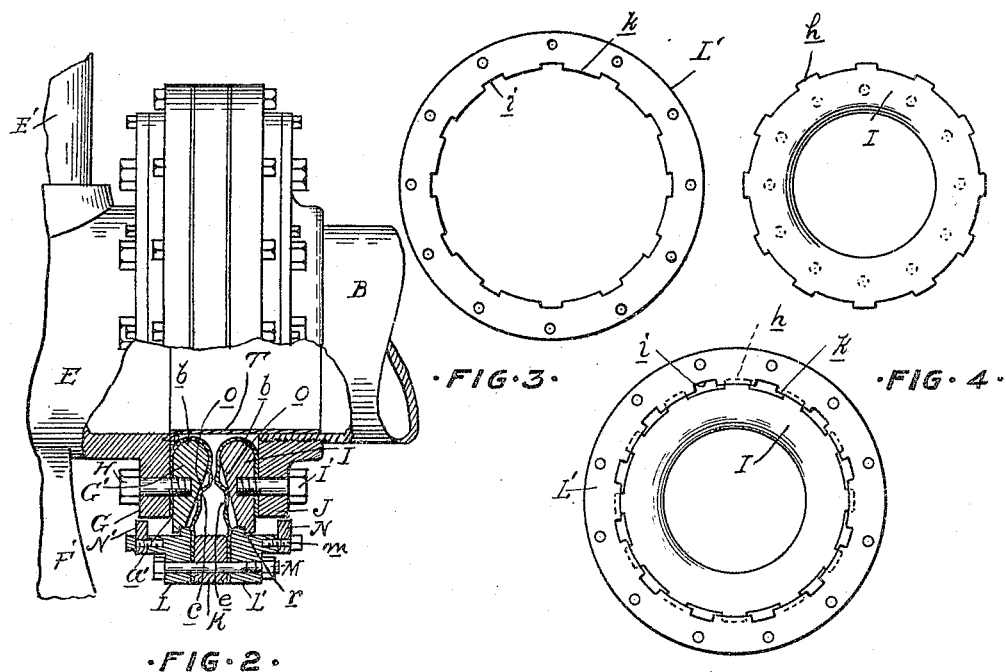
·FIG·2·  ·FIG·3·  ·FIG·4·  ·FIG·5·
WITNESSES
INVENTORS
BINGLEY R. FALES.
EUGENE L. BARNES.
BY James Whittemore
ATT'Y.

UNITED STATES PATENT OFFICE.

BINGLEY R. FALES AND EUGENE L. BARNES, OF DETROIT, MICHIGAN.

UNDERGROUND CONDUIT AND EXPANSION-JOINT THEREFOR.

No. 801,860.  Specification of Letters Patent.  Patented Oct. 17, 1905.

Application filed July 11, 1904. Serial No. 216,180.

*To all whom it may concern:*

Be it known that we, BINGLEY R. FALES and EUGENE L. BARNES, residing at Detroit, in the county of Wayne and State of Michigan, citizens of the United States, have invented certain new and useful Improvements in Underground Conduits and Expansion-Joints Therefor, of which the following is a specification, reference being had therein to the accompanying drawings.

The invention relates to underground conduits for steam, water, &c.; and it consists in the construction of a conduit and of an expansion-joint therefor.

The invention further consists in the construction of a conduit having an inclosing casing spaced therefrom with separated ends and a projecting casing between the ends of the conduit-casing, formed, preferably, of cement, such projecting casing inclosing a joint or fitting.

The invention further consists in the construction, arrangement, and combination of the various parts, as more fully hereinafter described.

In the drawings, Figure 1 is a vertical central longitudinal section through a portion of a conduit embodying our invention, partly in elevation, the expansion-joint in this case being illustrated in its open position. Fig. 2 is a sectional elevation of one of the expansion-joints shown in Fig. 1, showing the parts completely expanded. Figs. 3 and 4 are side elevations of two of the clamping-rings. Fig. 5 is an elevation of the two rings in their engaged position.

A and B represent two pipes which form portions of a conduit intended to be laid underground to convey steam or hot water or other fluids.

C and C' are two casing-sections for the conduit, spaced therefrom and having separated ends, as plainly shown in Fig. 1.

In building city heating plants in which there is a central station and conduits extending therefrom to various residences or stores it is customary to lay a conduit of metal pipe, like the conduit A B, and to inclose this conduit in a casing usually made of wood, spacing the casing therefrom, and the construction, so far as the parts A, B, C, and C' are concerned, is the usual construction employed at the present time in laying such conduits.

D is a block or saddle within the casing C C' and upon which the conduits A B rest, so as to space them from their inclosing casing.

We have shown a roller $a$ in this saddle, which may or may not be employed, as desired.

At the present time in building these conduits it is usual to supply them with expansion-joints and with T's and elbows and other fittings where branch mains are to be taken off, and at such points it is customary to build a brickwork well around the casings at the joints, and this brickwork is usually supported upon a brick or cement foundation. This requires quite an expensive structure and, inasmuch as expansion-joints are usually placed every fifty feet in the length of the conduit, adds greatly to the cost of installing such a plant.

So far as we are aware, in the building of these conduits two kinds of expansion-joints have been employed, either an ordinary slip-joint with packing, or a joint in which a large diaphragm is employed upon either side of an anchored cylindrical casing. The objection to the slip-joint is the necessity for repacking, and in many cases this has been found to be impracticable to use. The disadvantage of the large diaphragm-joint is that it requires a very large well, for the reason that they have but a single diaphragm for each run of pipe upon opposite sides of the anchored casing, and the expansion-joint on this account is much larger than the diameter of the conduit and its inclosing casing. Our improved joint is a diaphragm-joint, but one in which there are a multiple of diaphragms arranged to take up the expansion successively, in which case they can be made of lesser diameter than the inclosing casing, so that we are able to build a cement casing around the expansion-joint, having its inner diameter substantially the outer diameter of the inclosing casing for the conduit. This same connection between the ends of the casing at joints may be made where there are other fittings than expansion-joints, such as T's or elbows, and be equally useful at such points. By using the particular form of inclosing casing herein described we can project a nipple up into the cement casing or partially through the side thereof, so that when it is desired to make a connection simply a small part of the cement can be broken away and connection made with little difficulty.

In the particular form of our invention which is herein shown we have shown two expansion-joints upon opposite sides of an anchored fitting. This anchored fitting in this case is shown as a T E, one member of the T extending in line with the two conduit-sections A and B and the other branch having its opening upward, and in this opening we have shown secured a nipple E', provided with a cap F. This nipple E' extends slightly beyond the outer surface of the casing C C', and in this case we have shown it as projecting upward, which we consider the preferable arrangement.

F'' is a base or anchor for the T of any suitable shape.

The expansion-joints upon either side of the T are alike, and the description of one will suffice for both.

G is a flange upon the end of the T. G' is a clamping-ring clamped against this flange by the bolts H. Between the clamping-ring G' and the flange G is the inner edge $a'$ of the diaphragm $c$. The inner face of the ring G' is curved, as shown at $b$, so as not to present any angles against which the diaphragm may work or wear.

I is a clamping-ring similar to G', secured by the clamping-bolts I' to the flange J on the end of the conduit-section A or B. This clamping-ring has the same curved inner face $b$ as described for the ring G' and clamps the inner edge of the diaphragm $e$ between itself and the flange J.

K is a clamping-ring upon opposite sides of which the outer edges of the diaphragms $c$ or $e$ bear, and L and L' are two clamping-rings upon opposite sides of the ring K, clamped together upon the ring K, securing the outer edges of the diaphragm by means of the clamping-bolts M.

The rings G' and I are of the construction shown in Fig. 4, having a series of outward projecting lugs $h$, and the rings L and L' are of the construction shown in Fig. 3, having a complementary series of notches $i$. To engage the rings L and L' over the clamping-rings G' and I, the notches $i$ are registered with the lugs $h$, and then the ring L or L' is shoved over its clamping-ring I or G', and then given a partial rotation, so that the lugs $h$ are opposite the solid portions K of the clamping-rings for the outer edges of the diaphragms. This is illustrated in Fig. 5. Secured upon the outer faces of the clamping-rings L and L' are the two stops N and N', held in position by suitable screws $m$.

The parts being thus constructed their operation is as follows: The parts in their contracted position are shown in Fig. 1, in which position the diaphragms incline toward each other from their inner edge to their outer edge and are free from the inclined faces $o$ of the clamping-rings G' and I. In their extreme extended position the lugs $h$ on these clamping-rings are in contact, or nearly so, with the stops N and N'. Now assuming that the conduit B expands, its end would be projected inwardly and the flange J, having secured to it the clamping-ring I, will move in until its lug $h$ strikes a shoulder $r$ on the ring L'. During this movement the expansion of the pipe B will be taken up by the diaphragm $e$. When this diaphragm has thus taken up its limit of expansion, it will rest against and be backed by the inclined face $o$ of the clamping-ring I, so that pressure within the pipe will not tend to distort or injure the diaphragm and so that the strain will be largely taken off of that diaphragm. As soon as the lug $h$ on the ring I strikes the shoulder $r$ it will cause the ring K, together with the clamping-rings L and L' and the outer edge of both diaphragms to move with it, and the subsequent expansion will be taken up by the movement of the diaphragm $c$ from the position shown in Fig. 1 to that shown in Fig. 2. It will be seen that as soon as the diaphragm $c$ reaches the limit of its expansion it will rest against the inclined face $o$ of the ring G' and be held from damage or distortion by the pressure of the steam. The expansion of the pipe A will be taken up in the same manner by the expansion-joint at the left hand of the anchored casing. It will be observed that in this particular construction the exterior of the expansion-joint is slightly within the plane of the outer face of the casing-section C C'. This we are enabled to do—that is, to make the expansion-joint of small diameter—because we have a multiple of diaphragms successively taking the expansion of the pipe. Hence these diaphragms may be of comparatively small diameter. It is obvious also that a multiple of these expansion-joints may be placed side by side and successively take up the expansion if it is desired to so arrange them.

When the conduit-sections A and B with their casings C and C' are laid and the expansion-joints are in position, by laying a suitable mold in the trench we may build around the casing C C', and inclosing the expansion-joint, a connecting-casing O, of cement or similar material, the lower portion of this casing having embedded in it the anchor-casting F'', and the ends of this connecting-casing embracing and resting upon the ends of the conduit-casing C C'. We usually prefer to first build only the lower half of this connecting-casing, and then place over the upper half of the casing C C' a semicylindrical cap P, which forms the inner wall for the upper half of this connecting-casing. We may also secure a series of straps P', extending from the opposite ends of the casing C C' and above the sheet-metal cap P, to strengthen the upper portion of the connecting-casing, which may then be molded over the top and the resulting structure be as shown in Fig. 1.

We preferable arrange the nipple E' so that it will extend nearly through the connecting-casing O and build up a small mound-shaped portion Q over the cap thereof, so that when it is desired to make the connection with the nipple E' all that is necessary to do is to break away the cap or mound Q and enough cement around the nipple so that the cap F may be removed and the pipe or fitting coupled or screwed thereon. In this way connection may be made to the conduit without breaking through the connecting-casing O.

If desired, the nipple E' may extend clear through the casing O; but to prevent the rusting of this nipple it is desirable to inclose it with the cement, as shown.

In order to hold more firmly the conduit-casings C C' in proper relation to each other, we preferably form the shoulders S in the cement at opposite ends abutting against the ends of the casing-sections, as shown in Fig. 1.

When it is desired to simply take off a branch connection without employing an expansion-joint, we may employ the T E and couple that T direct to the conduit-sections A and B, employing the nipple E', the cap F, and the connecting-casing O. This is obvious without further illustration than that already given in the drawings, as in that case the flanges on the pipe A B would be coupled directly to the flanges G on the T, and the expansion would be taken up at some other point in the length of the conduit. With this construction we find that an expansion-joint extremely small in diameter can be constructed which is quite economical to manufacture and which will stand a great amount of expansion and contraction without leakage and without the necessity of any packed joints; also, that the cost of the wells at the expansion-joints and other fittings is very greatly reduced, inasmuch as this cement structure can be put in by unskilled workmen and inasmuch as connections can be taken therefrom without the necessity of breaking through the connecting-casing.

We have shown the usual sleeve or nipple T secured to the outer end of the T and projecting beyond the flange of the conduit-section to prevent eddies of the steam in the annular chamber in which are located the diaphragms.

It will be seen that the diaphragm in this case is bent back upon itself at its inner edge, so that the clamping portion of the diaphragm is directly opposite the yielding or springing portion thereof. The result of this is that the yielding portion of the diaphragm extends inward almost if not quite to the inner diameter of the conduits, and this also assists materially in enabling us to reduce the diameter of the expansion-joint as compared to a structure in which the diaphragm is simply ring-shaped sheet metal clamped at the inner edge and the outer edge. In this last-mentioned construction the spring or bending portion of the diaphragm must be beyond the clamping portion, and thus the diaphragm itself must extend farther out from the conduit in order to get the same width of yielding or spring portion.

What we claim as our invention is—

1. In an expansion-joint the combination of two tubular members, diaphragms connected to each at their inner edges, and a positively longitudinally-moved rigid ring connecting their outer edges.

2. In an expansion-joint, the combination of two tubular members, a multiple of diaphragms forming a sealed connection between said pipes, each movable within fixed limits, and a rigid backing for each diaphragm after it has reached its fixed limit of movement.

3. In an expansion-joint the combination of two tubular members, clamping-rings for each member, annular diaphragms secured by said rings at their inner edges, a loose ring to which the outer edges are clamped, means for moving each diaphragm within fixed limits, said clamping-rings forming backings for the diaphragms after they have reached their limit of movement.

4. In an expansion-joint, the combination with two tubular members, diaphragms connected to each at their inner edges, and a longitudinally-movable rigid ring, of rings clamping said diaphragm to said members and operating to move said longitudinally-movable rigid ring.

5. In an expansion-joint, a multiple of diaphragms each movable within fixed limits, and a clamping-ring for the inner edge of each diaphragm, said clamping-ring forming a backing for said diaphragm and tending to transmit further movement to the next diaphragm when said limit of motion has been reached.

6. The combination of a conduit, a T therein, a casing for the conduit spaced therefrom and having separated ends between which the T is located, of a bridging-casing between the ends of the conduit-casing consisting of a cement tube supported on and bridging the space between the ends of the conduit-casing, one member of the T projecting into said cement tube.

7. The combination of a conduit, an expansion-joint therefor consisting of a T, one member of which is connected in the line of the conduit and the other extends at an angle thereto, of a diaphragm expansion-joint on each side of the T and an anchor for the T.

8. The combination of a conduit, an anchored T, the conduit connected to opposite ends of one member of the T, an expansion-joint between the T and one conduit, a conduit-casing spaced from the conduit and having separated ends, and a tubular cement casing connecting the ends of the conduit-casing and inclosing the T.

9. In an expansion-joint, the combination of a tubular member a diaphragm secured at one edge to said tubular member, the ring I forming such securing means, said ring having a curved inner face forming a backing for the diaphragm, when the limit of expansion is reached, and means on the ring for preventing further expanding movement of the diaphragm beyond such limit.

10. In an expansion-joint, a ring such as I, the diaphragm, the ring being substantially the width of the diaphragm and combined therewith to form a backing for the diaphragm when the same has reached its limit of expansion.

11. In an expansion-joint, the combination with a conduit, a flexible diaphragm, and the ring such as I, having a curved inner face forming a backing for the diaphragm when its limit of expansion is reached, and having circumferential lugs for preventing further expansion of the diaphragm.

12. In an expansion-joint, the clamping-ring I having a curved inner face, a diaphragm having its inner edge bent around said curved face, means for clamping the edge of the diaphragm to the outer face of said ring, and clamping means for the outer edge of the diaphragm.

In testimony whereof we affix our signatures in presence of two witnesses.

BINGLEY R. FALES.
EUGENE L. BARNES.

Witnesses:
 JAS. P. BARRY,
 E. D. AULT.